(12) United States Patent
Jiang et al.

(10) Patent No.: US 6,785,344 B1
(45) Date of Patent: Aug. 31, 2004

(54) FAST THRESHOLD DETERMINATION FOR PACKET-MULTIPLEXED DIGITAL COMMUNICATION

(75) Inventors: Jing Wen Jiang, San Jose, CA (US); Robert J. Deri, Pleasanton, CA (US)

(73) Assignee: Terawave Communications, Inc., Hayward, CA (US)

( * ) Notice: Subject to any disclaimer, the term of this patent is extended or adjusted under 35 U.S.C. 154(b) by 710 days.

(21) Appl. No.: 09/614,653

(22) Filed: Jul. 12, 2000

Related U.S. Application Data

(60) Provisional application No. 60/196,458, filed on Apr. 11, 2000.

(51) Int. Cl.$^7$ ............................................. H04L 25/10
(52) U.S. Cl. ..................................................... 375/317
(58) Field of Search ................................ 375/317, 233, 375/360

(56) References Cited

U.S. PATENT DOCUMENTS

| | | | | |
|---|---|---|---|---|
| 4,340,940 A | * | 7/1982 | Williams et al. | 708/550 |
| 4,679,209 A | * | 7/1987 | Hogeboom et al. | 375/287 |
| 4,856,076 A | * | 8/1989 | Maeda | 382/273 |
| 5,430,766 A | | 7/1995 | Ota et al. | 375/318 |
| 5,475,342 A | | 12/1995 | Nakamura et al. | 330/136 |
| 5,517,134 A | * | 5/1996 | Yaklin | 327/65 |
| 5,539,779 A | | 7/1996 | Nagahori | 375/317 |
| 5,737,366 A | | 4/1998 | Gehlot | 375/238 |
| 5,875,050 A | | 2/1999 | Ota | 359/189 |
| 6,121,802 A | * | 9/2000 | Luciano et al. | 327/131 |
| 6,529,566 B1 | * | 3/2003 | Carsello et al. | 375/340 |

OTHER PUBLICATIONS

M. Nakamura et al., "A 156–Mb/s CMOS Optical Receiver for Burst–Mode Transmission", IEEE; Journal of Solid-State Circuits, vol. 33, No. 8, Aug. 1998, pp. 1179–1187.
Y. Ota et al., High–Speed, Burst–Mode, Packet–Capable Optical Receiver and Instantaneous Clock Recovery for Optical Bus Operation, J. Lightware Tech., vol. 12, No. 2, Feb. 1994, pp. 325–330.
B. Razavi, "Monolithic Phase–Locked Loops and Clock Recovery Circuits", IEEE Press, Piscataway NJ, 1996, pp. 1–39.
Y. Yamada et al., "Burst–mode differential receiver for optical packet communication", Electronics Letters 32, Aug. 1, 1996, vol. 32, No. 16, pp. 1500–1501.

* cited by examiner

*Primary Examiner*—Stephen Chin
*Assistant Examiner*—Kevin Kim
(74) *Attorney, Agent, or Firm*—Fenwick & West LLP

(57) ABSTRACT

The present invention includes a system that determines a threshold to distinguish between binary signals. The system includes a bit wise threshold determination device coupled to receive an input signal and that delays the input signal, averages the input signal and the delayed input signal, and outputs the average to an output node. The average represents a threshold value. This system can be used in any system that must determine a threshold between binary values.

6 Claims, 3 Drawing Sheets

FAST THRESHOLD DETERMINATION FOR PACKET-MULTIPLEXED DIGITAL COMMUNICATION

PRIOR APPLICATION

This application claims the benefit of U.S. Provisional Application No. 60/196,458, filed Apr. 11, 2000.

FIELD OF THE INVENTION

The present invention relates generally to communications systems and more particularly to data differentiation in communications systems.

RELATED ART

Several modem communications systems employ packet-multiplexed transmission, in which multiple data sources transmit over a shared medium using a time-division multiple-access (TDMA) protocol to a central master location. For example, one such system is a passive fiber optic network described in ITU Standard G.983 (the "Standard"), which is incorporated by reference herein in its entirety. FIG. 1 depicts in block diagram form a passive fiber optic network 100 described in the Standard. Multiple remote stations (depicted as ONU 104-1 to 104-n) are data sources that each communicate with a receiver at the master location (the OLT 102). ONUs transmit packets of information during time slots assigned by the OLT, so that packets originating from different ONUs are interleaved in time on the transmission medium. If the ONUs are at different distances from the OLT, the signal level at the OLT can vary substantially depending on which ONU is sending the data. Thus the decision threshold for distinguishing between ONE and ZERO levels in digital data streams must be recalibrated by the OLT every time a different ONU transmits to the OLT because the analog signal strength from each ONU is distinct at the OLT. If different source transmissions are interleaved rapidly on a communication fiber, for example on a packet-by-packet or cell-by-cell basis, rapid threshold recalibrations are necessary.

Establishing a correct threshold value, for example at a level close to the average of the ONE and ZERO levels, is important to minimize impairments due to both amplitude noise and timing errors. If the threshold is placed too close to a ONE or ZERO level, then amplitude noise in the system will increase the frequency of incorrectly detected bits. In addition, improper threshold adjustment causes transitions to occur at incorrect times (so called "pulse width distortion"), with the effect that bits of one signal level will have reduced duration while bits at the other logic level will have excessive duration. This pulse width distortion complicates clock recovery and data timing.

Generally, the threshold should be optimally set halfway between the analog signal levels corresponding to digital ONE and ZERO levels. For example, for ATM cells transmitted at 155 megabits/s, each cell is transmitted in 2.7 microseconds, so that the threshold must be reset in a much shorter time (e.g., tens of nanoseconds). As the signaling rate increases above 155 megabits/s, the time to establish the threshold level becomes correspondingly shorter. In the fiber optic passive optical network defined in the Standard, the optical input signal strength to the OLT can vary by as much as 19 dB. Because the extinction ratio (ratio of logical ONE to ZERO levels) is only 10 dB in the Standard, the logical ONE level associated with one ONU may be smaller than the logical ZERO level associated with a different ONU.

FIG. 2 depicts a block diagram of a conventional TDMA receiver 200, used for example by OLT 102, that converts optical signals into binary data. The receiver 200 accepts an analog signal input consisting of a digitally encoded optical signal. The conventional photodiode 202 converts the optical input into an electrical current, and the conventional low-noise trans-impedance amplifier 204 converts the electrical current into an analog voltage. A conventional filter 206, such as a low pass filter, filters the output signal from the amplifier 204 to reduce noise and improve sensitivity, and provides the filtered output to a conventional comparator 212 (also known as a quantizer or limiting amplifier). Threshold setting device 208 is coupled to receive the filtered signal at node 214 from filter 206 and determines and provides a threshold value to the conventional sample-and-hold or track-and-hold amplifier 210. The amplifier 210 provides the threshold value to an input of comparator 212, possibly fixing the value for the duration of an input data packet. The comparator 212 compares the analog voltage against a reference value, the threshold, and outputs a digital signal (either a logic level ONE or logic level ZERO) depending on whether the analog voltage is greater than or less than the threshold.

Typically in the system described in the Standard, data is transmitted by a source in packets. The useful data in a data packet is preceded by a sequence of signal bits (typically a repetitive ONE-ZERO sequence) which carries no useful information. These additional bits, referred to as the preamble, are used to establish the threshold value to be used by the threshold setting device of FIG. 2 for determining the threshold. Because the preamble transports no useful information, the length of the preamble should be minimized to improve the transmission rate of useful data.

One conventional threshold setting device 208 uses a pair of peak detectors to measure the ONE and ZERO levels of the input signal, and then uses the average of these values as the threshold (so called "peak detector"). See for example the following publications or issued patents which are each incorporated by reference herein in their entirety: M. Nakamura, N. Ishihara, and Y. Akazawa, "A 156 Mbs CMOS Optical Receiver for Burst-mode Transmission", IEEE J. Sol. St. Circuits, 33, 117901187 (1998); Y. Ota, R. G. Swartz, V. D. Archer, S. K. Korotky, and A. E. Dunlop, "High-speed, Burst-mode Packet Capable Optical Receiver and Instantaneous Recovery for Optical Bus Operation", J. Lightwave Technology 12, 325–330 (1994); U.S. Pat. No. 5,475,342, issued Dec. 12, 1995 to Nakamura et al., and entitled "Amplifier for Stably Maintaining a Constant Output"; U.S. Pat. No. 5,430,766, issued Jul. 4, 1995 to Ota et al., and entitled "Burst Mode Digital Data Receiver"; and U.S. Pat. No. 5,875,050, issued Feb. 23, 1999 to Ota, and entitled "Burst Mode Digital Optical Receiver".

The peak detector provides very fast threshold detection, but has several difficulties associated with it. For example, the peak detector must operate at the input signal bit rate, which at high rates (e.g., 155 megabits/s or above) requires high slew rate within the peak detection block for accurate peak determination. High slew rate becomes increasingly difficult to achieve at higher bit rates. The peak detector is also fully susceptible to noise corruption because the peak detector must operate at high speed compared to the bit rate to provide high-fidelity signal tracking. Signal noise during peak detection, which can not be filtered, will result in imperfect threshold adjustment. Another example of the difficulty with the peak detector is the cost of peak detection can be higher than other approaches, because it requires two amplifiers (a first for ONE level detection and second for ZERO level detection).

Another conventional threshold setting device uses temporal averaging circuits to measure the average of the ONE and ZERO levels during the preamble (so called "temporal averaging detector"). The temporal averaging detector uses low pass filters (e.g., resistor-capacitor circuits) or integrators (amplifiers with capacitors) to average the signal level over many bit periods. They generally work by charging a capacitor over many bit periods. See for example, U.S. Pat. No. 5,539,779 issued Jul. 23, 1996 to T. Nagahori, and entitled "Automatic offset control circuit for digital receiver", which is incorporated by reference herein in its entirety. The temporal averaging detector reduces noise due to the averaging process, but it is typically slow because the preamble must be averaged over many bits. The averaging is typically achieved using a capacitor charging circuit, which can be quite slow. Typical temporal averaging detectors require 24 to 32 bits of preamble.

Thus what is needed is a threshold determination system that provides for rapid and reliable threshold determination at high bit rates.

SUMMARY

One embodiment of the present invention includes a system that determines a threshold to distinguish between binary signals, where the system includes a bit wise threshold determination device coupled to receive an input signal and that delays the input signal, averages the input signal and the delayed input signal, and outputs the average to an output node, where the average represents a threshold value.

One embodiment of the present invention includes a system for converting an analog signal into a binary signal, where the system includes: a threshold detection system coupled to receive an input signal, where the threshold detection system delays the input signal, averages the input signal and the delayed input signal, and outputs the average to an output node and where the average represents a threshold signal; an amplifier coupled to receive the threshold signal from the threshold detection system and that outputs a sustained threshold signal; and a comparator coupled to receive the threshold signal from the amplifier and coupled to receive the input signal, where the comparator generates a binary signal based on a comparison between the threshold signal and the input signal.

One embodiment of the present invention includes a system for converting an analog signal into a binary signal, the system including: a threshold detection system coupled to receive an input signal, where the threshold detection system delays the input signal, averages the input signal and the delayed input signal, and outputs the average to an output node and where the average represents a threshold signal; a storage device coupled to receive the threshold signal from the threshold detection system and that stores the threshold signal; and a comparator coupled to receive the threshold signal from the storage device and coupled to receive the input signal, where the comparator generates a binary signal based on a comparison between the threshold signal and the input signal.

Advantageously, embodiments of the present invention determine threshold values more quickly than the temporal averaging detector by measuring threshold values instantaneously as opposed to using an averaging process. Advantageously, embodiments of the present invention determine a threshold value using as few as two (2) bits thereby reducing the required length of a preamble.

This invention will be more fully understood upon consideration of the detailed description below taken together with the accompanying drawings.

BRIEF DESCRIPTION OF THE DRAWINGS

Use of the same reference numerals in different figures indicates identical or similar elements.

DETAILED DESCRIPTION

The contents of U.S. patent application Ser. No. 60/196,458, entitled "Fast Threshold Determination Circuit for Packet-Multiplexed Digital Communication", filed Apr. 11, 2000, inventors Jiang and Deri is incorporated by reference in its entirety.

Figure 1:
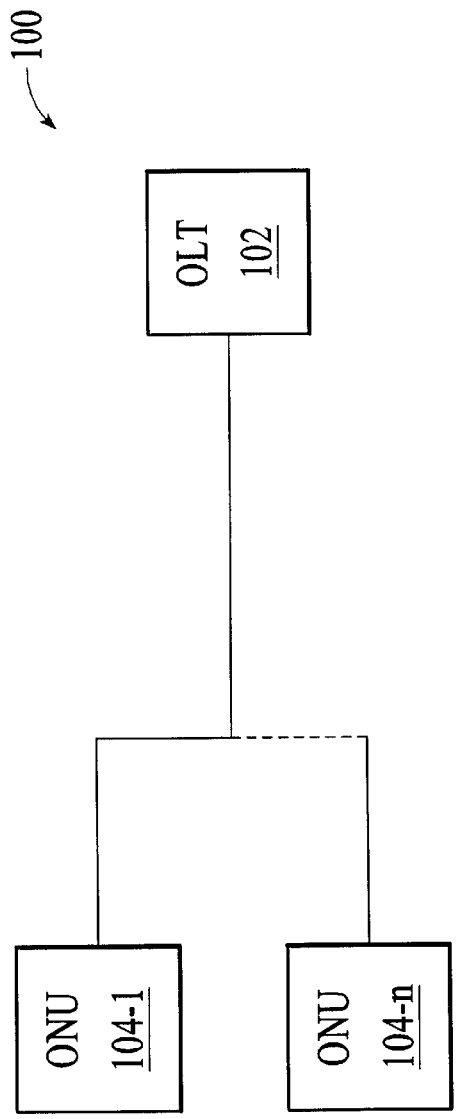
FIG. 1 (prior art) depicts in block diagram form a passive fiber optic network 100.
Figure 2:
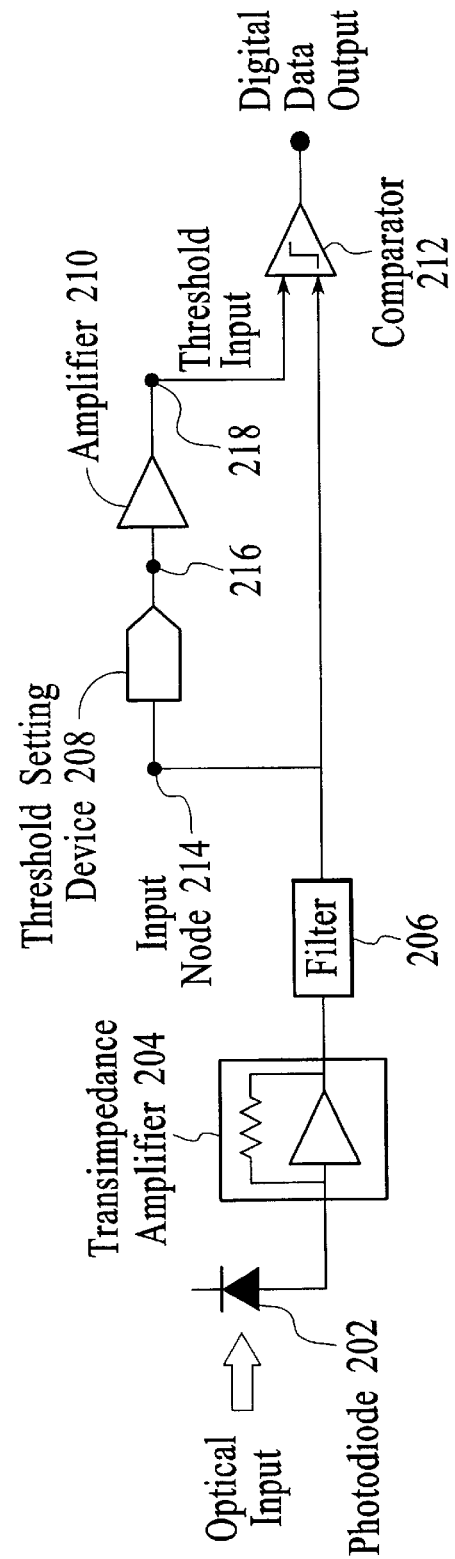
FIG. 2 (prior art) depicts in block diagram form a conventional TDMA receiver 200.
Figure 3:
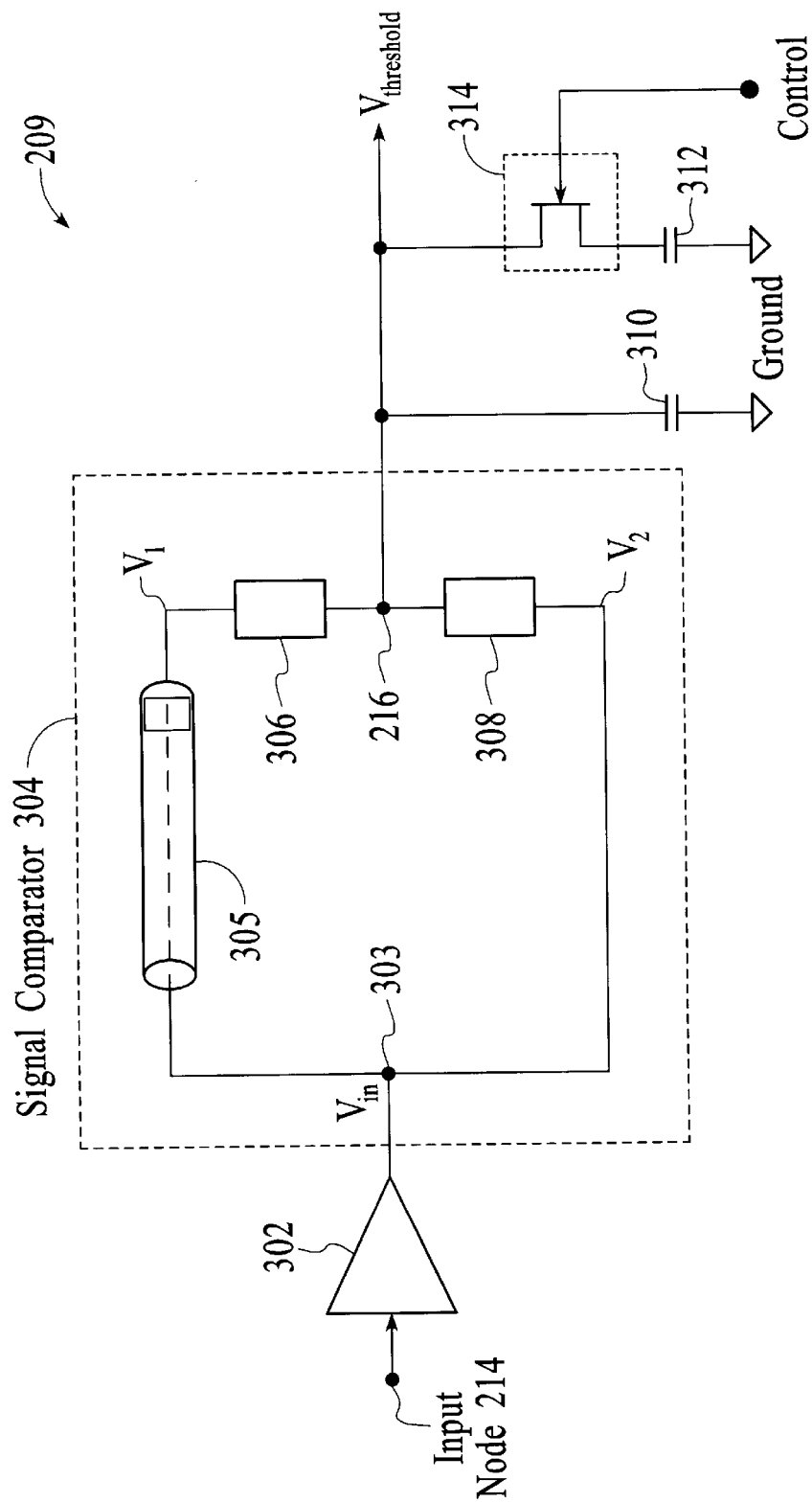
FIG. 3 depicts in a block diagram form an embodiment of the present invention in threshold detection system 209 that replaces threshold setting device 208 of the receiver 200 of FIG. 2.

FIG. 3 depicts in a block diagram form an embodiment of the present invention in threshold detection system 209 that replaces threshold setting device 208 of the receiver 200 of FIG. 2. Threshold detection system 209 includes a buffer 302, bit wise threshold determination device 304, first spike filter 310, switch 314 and second spike filter 312. Advantageously, threshold detection system 209 determines a threshold value using as little as two (2) bits thereby reducing the required length of a preamble. Advantageously, threshold detection system 209 determines threshold values more quickly than the temporal averaging detector because threshold detection system 209 measures threshold values instantaneously as opposed to using an averaging process.

Referring to FIG. 3, conventional buffer 302, such as a unity gain buffer amplifier, is coupled to receive the input signal at node 214 from the filter 206 of FIG. 2. The buffer 302 isolates the threshold detection system 209 from filter 206. The buffer 302 provides its output signal to bit wise threshold determination device 304 (i.e., node 303).

Bit wise threshold determination device 304 includes first impedance element 306, second impedance element 308, and delay element 305. Delay element 305, such as a transmission delay line, is coupled to node 303 to receive the output signal from buffer 302. Delay element 305 provides a one bit delay of the signal from node 303 to first impedance element 306 (i.e., $V_1$). Second impedance element 308 is coupled to node 303 (i.e., node $V_2$) to receive the output signal from buffer 302. Each of first impedance element 306 and second impedance element 308 are coupled to node 216. Each of impedance elements 306 and 308 has an impedance of Zo. A suitable implementation of each of impedance elements 306 and 308 is a resistor. Because the impedance of impedance elements 306 and 308 are matched, the output voltage at node 216 is the average of the one bit delayed signal at node $V_1$ and the original signal from node 303.

Each of the signal paths through second impedance element 308 and a combination of delay element 305 and first impedance element 306 has a characteristic impedance Zo. Each path is driven by buffer 302 to minimize reflections and provide sufficient current drive. In one embodiment, the buffer 302 has an output impedance to node 303 equal to Zo/2 to minimize multiple reflections that can cause errors in threshold determination.

The bit wise threshold determination device 304 applies the threshold voltage to node 216, which is coupled to the amplifier 210 of receiver 200. The amplifier 210 holds the threshold voltage constant after the preamble to enable the receiver 200 to identify bits in the data payloads.

Figure 4:
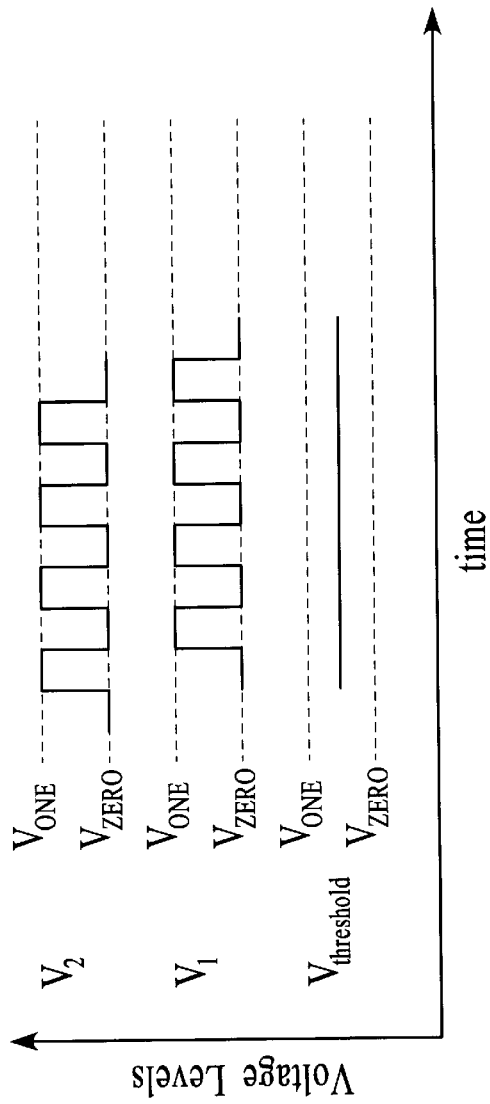
FIG. 4 depicts an example of voltages $V_1$ and $V_2$ and the threshold voltage at node 216 of the threshold detection system 209 in accordance with an embodiment of the present invention.

For example, FIG. 4 depicts an example of the threshold voltage at node 216 ($V_{threshold}$) and voltages $V_1$ and $V_2$. After a signal at node 303 toggles between amplitudes representing logical ONE and ZERO, the bit wise threshold determination device 304 outputs a correct threshold voltage, i.e., the average amplitude between a logical ONE and ZERO. Thus for some preambles, the bit wise threshold determination device 304 determines a threshold voltage in only two (2) bits. Thus the bit wise threshold determination device 304 is potentially much faster than the temporal averaging detector described earlier, which averages the signal level over many bit periods.

In non-ideal implementations of bit wise threshold determination device 304, the delay of delay element 305 may not be precisely one bit period. In this case, the output at node 216 is not always at exactly the ideal threshold value. The threshold value will deviate as either a positive or negative spike at the beginning and end of a bit period, but only for a very short time. To minimize this effect, in one embodiment, a spike filter 310 having a small capacitance is coupled to the node 216. The capacitance forms an RC filter with the impedance Zo which filters out the voltage spikes (transients) which are generated by non-ideal delay times. In practice, the value of the capacitance of spike filter 310 preferably is set to a capacitance on the order of the delay error in the delay element 305 divided by Zo. Note that the time constant of this filter can be small compared to a bit period, unlike the temporal averaging detector described above. The number of preamble bits required to determine the threshold value can be very small and is limited by fabrication tolerances on the time delay and the speed of the buffer 302 and amplifier 210.

Bit wise threshold determination device 304 properly detects threshold values for alternating ONE-ZERO input data patterns. However, in some instances, such as during a procedure called "ranging" as described in the Standard, bit wise threshold determination device 304 cannot lock onto a toggling ONE-ZERO pattern, but must establish a correct threshold using an input data stream that contains sequences of identical values such as ONE-ONE or ZERO-ZERO. In such instances, transient voltages spikes, in addition to those generated by non-ideal delay of delay element 305, are present at node 216. In one embodiment of the present invention, second spike filter 312 having a capacitive characteristic is selectively coupled to node 216 to filter out additional transient spikes. Coupling of second spike filter 312 to node 216 is controlled using switch 314. A suitable implementation of switch 314 is a CMOS transistor-type of analog switch. Use of additional capacitive elements slows the speed that a threshold value is available at node 216. Switch controlled coupling thereby avoids reducing speed during normal operation (e.g., operation during non-ranging).

For efficient ranging operation, ranging patterns consisting of no more than two consecutive identical bits are used. Examples include a ONE-ZERO preamble followed by bytes of hexadecimal pattern 0h6A or 0h35. The inverse of this bit string is also useable. For this case, the capacitance of second capacitive element 312 is increased to achieve a total RC time constant equal to several bit periods. It is also necessary to increase the preamble during ranging operation, in order to pre-charge second capacitive element 312. Note that the overall ranging packet size does not increase because the pattern to be detected can be only one or a few bytes of the hexadecimal pattern and does not need to be as large as a normal packet payload.

In one implementation of the threshold detection system 209, delay element 305 has a characteristic impedance Zo of 50 ohms, and impedance elements 306 and 308 have a resistance Zo of 100 ohms, spike filter 310 has a capacitance between 5 to 47 pF and second spike filter 312 has a capacitance of approximately 270 pF.

Figure 5:
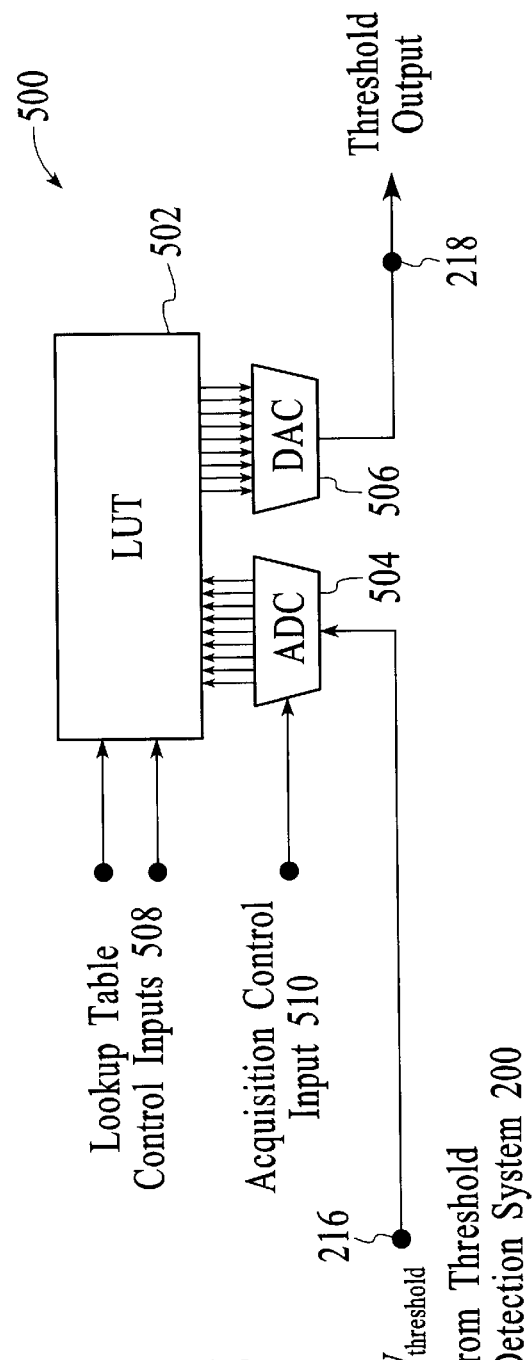
FIG. 5 depicts in block diagram form a storage system 500 that replaces track/hold amplifier 216 of receiver 200 in accordance with an embodiment of the present invention.

In one embodiment of the present invention, the track/hold amplifier 210 of receiver 200 is replaced by the storage system 500 of FIG. 5. One advantage of the use of storage system 500 is that a threshold previously determined for a particular signal source or ONU can be provided to the comparator 212 of FIG. 2 without the delay associated with use of threshold setting device 208. Storage system 500 includes a lookup table 502 coupled to receive input threshold values from a conventional analog-to-digital converter (ADC) 504 and coupled to provide threshold values to a conventional digital-to-analog converter (DAC) 506, such as a latching DAC circuit. The DAC 506 provides threshold values to comparator 212 of FIG. 2.

For example, storage system 500 stores a threshold value generated by threshold setting device 208 by converting the analog version of the threshold value into a digital signal and stores such digital signal into the lookup table 502. In one embodiment, control signal inputs 508 to the lookup table 502 associate a source ONU or signal source with the threshold value. In conjunction with the control signal inputs 508, acquisition control input 510 is applied to the ADC 504 to allow ADC 504 to output signals to the lookup table 502. In one embodiment, an OLT applies both control signal inputs 508 and acquisition control input 510. Subsequently, control signal inputs 508 to the lookup table 502 can be used to request a threshold value associated with an ONU or signal source from the lookup table 502 thereby providing a more rapid output of a threshold value because use of the threshold detection system 200 is bypassed.

Another advantage of the ADC-DAC combination is that it enables the receiver 200 to hold the threshold voltage indefinitely to an input of the comparator 212. By contrast, the hold time of amplifier 210 varies in proportion to its capture time, so that a threshold value can be held only for short data packets.

Modifications

While the invention has been particularly shown and described with reference to a preferred embodiment, it will be understood by persons skilled in the relevant art that various changes in form and details can be made therein without departing from the spirit and scope of the invention.

What is claimed is:

1. A system that determines a threshold value to distinguish between binary signals, the system comprising:

a bit wise threshold determination device coupled to receive an input signal and that delays the input signal, averages the input signal and the delayed input signal, and outputs the average to an output node, wherein the average represents the threshold value; and a storage system coupled to the output node and that selectively stores and selectively provides threshold values to the output node, wherein the storage system comprises:

an analog-to-digital converter coupled to the output node that converts the threshold value into a digital signal; and a look-up table coupled to the analog-to-digital converter that stores the digital signal.

2. A system that determines a threshold value to distinguish between binary signals, the system comprising:

a bit wise threshold determination device coupled to receive an input signal and that delays the input signal, averages the input signal and the delayed input signal, and outputs the average to an output node, wherein the average represents the threshold value; and a storage system coupled to the output node and that selectively stores and selectively provides threshold values to the output node;

a look-up table that stores threshold values and that retrieves a threshold value in response to control signals; and a digital-to-analog converter coupled to the look-up table and that converts the threshold value into an analog signal.

3. The system of claim 2, wherein the control signals identify a source transmitter of the input signal.

4. The system of claim 1, further comprises an amplifier coupled to receive the threshold value from the bit wise threshold determination device and which outputs a threshold value.

5. The system of claim 1, wherein the input signal is associated with a specific source transmitter.

6. A system for converting an analog signal into a binary signal, the system comprising:

a threshold detection system coupled to receive an input signal, wherein the threshold detection system delays the input signal, averages the input signal and the delayed input signal, and outputs the average to an output node and wherein the average represents a threshold signal;

a storage device coupled to receive the threshold signal from the threshold detection system and that stores the threshold signal; wherein the storage device comprises:

an analog-to-digital converter coupled to receive the threshold signal and that converts the threshold signal into a digital signal; and a look-up table coupled to the analog-to-digital converter that stores the digital signal; and a comparator coupled to receive the threshold signal from the storage device and coupled to receive the input signal, wherein the comparator generates a binary signal based on a comparison between the threshold signal and the input signal.

* * * * *